(12) United States Patent
Rikoski (10) Patent No.: US 11,482,867 B2
(45) Date of Patent: Oct. 25, 2022

(54) SYSTEMS AND METHODS FOR CONFIGURABLE BATTERY CHARGING

(71) Applicant: Hadal, Inc., Oakland, CA (US)

(72) Inventor: Richard J. Rikoski, Alameda, CA (US)

(73) Assignee: HADAL, INC., Oakland, CA (US)

( * ) Notice: Subject to any disclaimer, the term of this patent is extended or adjusted under 35 U.S.C. 154(b) by 248 days.

(21) Appl. No.: 16/009,085

(22) Filed: Jun. 14, 2018

(65) Prior Publication Data

US 2018/0366955 A1 Dec. 20, 2018

Related U.S. Application Data

(60) Provisional application No. 62/519,279, filed on Jun. 14, 2017.

(51) Int. Cl.
*H02J 7/00* (2006.01)
*B60L 58/19* (2019.01)
(Continued)

(52) U.S. Cl.
CPC ............ *H02J 7/0029* (2013.01); *B60L 50/66* (2019.02); *B60L 53/305* (2019.02); *B60L 53/68* (2019.02);
(Continued)

(58) Field of Classification Search
CPC .......... B60L 53/30; B60L 53/60; B60L 53/62; B60L 53/67; B60L 50/66; B60L 58/19; B60L 2240/547; B60L 2200/10; B60L 2200/32; B60L 53/00; B60L 53/50; B60L 53/51; B60L 53/52; B60L 53/53; B60L 53/54; B60L 53/55; B60L 53/68; H02J 7/0024; H02J 7/0013; H02J 7/00036; H02J 7/342; H02J 7/0026; H02J 7/0031; H02J 7/0027; H02J 7/0042; H02J 7/00034;
(Continued)

(56) References Cited

U.S. PATENT DOCUMENTS 6,342,775 B1 1/2002 Sleder et al.
6,624,616 B1 9/2003 Frerking et al.
(Continued)

FOREIGN PATENT DOCUMENTS

CN 106364348 A 2/2017
EP 3508371 A1 7/2019
(Continued)

*Primary Examiner* — Richard V Muralidar
(74) *Attorney, Agent, or Firm* — Burns & Levinson LLP; Christopher Carroll (57) ABSTRACT

Systems and methods are disclosed herein for a charging system. The charging system may be implemented within an independent charging station or within an autonomous vehicle. Boolean charging can be used to obtain the desired charge or discharge voltage for charging an autonomous vehicle at a charging station. By combining a subset of a sequence of batteries arrays that differ in voltage by powers of two in series, where each battery array may include multiple batteries or battery cells, a voltage may be obtained which is equal to the sum of the voltages across each battery array. This voltage may be used in turn to charge additional batteries or battery arrays. The process may be repeated until the desired amount of battery arrays has been charged and the desired voltage has been achieved.

12 Claims, 9 Drawing Sheets

(51) Int. Cl.
  *G05D 1/00* (2006.01)
  *B63G 8/08* (2006.01)
  *B60L 50/60* (2019.01)
  *H02J 7/34* (2006.01)
  *B60L 53/68* (2019.01)
  *B60L 53/30* (2019.01)
  *B63G 8/00* (2006.01)

(52) U.S. Cl.
  CPC ............... *B60L 58/19* (2019.02); *B63G 8/08* (2013.01); *G05D 1/0088* (2013.01); *H02J 7/0013* (2013.01); *H02J 7/0024* (2013.01); *H02J 7/0026* (2013.01); *H02J 7/0027* (2013.01); *H02J 7/0031* (2013.01); *H02J 7/00036* (2020.01); *H02J 7/0042* (2013.01); *H02J 7/342* (2020.01); *B60L 2200/10* (2013.01); *B60L 2200/32* (2013.01); *B60L 2240/547* (2013.01); *B63G 2008/008* (2013.01); *H02J 7/00034* (2020.01); *H02J 7/00304* (2020.01); *H02J 7/00306* (2020.01)

(58) Field of Classification Search
  CPC ............ H02J 7/00304; H02J 7/00306; H02J 2310/42; H02J 7/1446; H02J 7/14; H02J 7/0029; G05D 1/0088; B63G 8/08; B63G 2008/008
  USPC ................................................ 320/109, 104
  See application file for complete search history.

(56) References Cited

U.S. PATENT DOCUMENTS

| | | | | |
|---|---|---|---|---|
| 7,183,742 | B2 * | 2/2007 | Potter | B63G 8/001 320/101 |
| 8,860,362 | B2 * | 10/2014 | Kamen | B60L 53/305 320/109 |
| 9,079,505 | B1 * | 7/2015 | Hyde | G08G 1/202 |
| 9,434,267 | B2 * | 9/2016 | Wang | B64D 27/24 |
| 9,878,631 | B2 * | 1/2018 | Hyde | B60L 1/14 |
| 2004/0145347 | A1 * | 7/2004 | Yang | H02J 7/0016 320/116 |
| 2006/0005758 | A1 | 1/2006 | Potter et al. | |
| 2006/0102532 | A1 * | 5/2006 | Cadotte, Jr. | E04H 4/1654 210/94 |
| 2006/0208692 | A1 * | 9/2006 | Kejha | H01M 10/441 320/103 |
| 2007/0024234 | A1 * | 2/2007 | Potter | B63G 8/001 320/104 |
| 2008/0007203 | A1 * | 1/2008 | Cohen | H02J 7/045 320/104 |
| 2010/0207577 | A1 * | 8/2010 | Sugiyama | H02J 7/008 320/118 |
| 2011/0025267 | A1 * | 2/2011 | Kamen | B60L 55/00 320/109 |
| 2011/0087853 | A1 * | 4/2011 | Yamada | G11C 7/24 711/167 |
| 2012/0133310 | A1 * | 5/2012 | Lee | B60L 58/21 318/139 |
| 2014/0061376 | A1 * | 3/2014 | Fisher | B64D 27/00 244/62 |
| 2015/0295430 | A1 | 10/2015 | Wright et al. | |
| 2016/0039300 | A1 * | 2/2016 | Wang | B64D 35/02 244/39 |
| 2016/0315490 | A1 | 10/2016 | Xu et al. | |

FOREIGN PATENT DOCUMENTS

| | | |
|---|---|---|
| JP | 2001258166 A | 9/2001 |
| JP | 2006239797 A | 9/2006 |
| JP | 2012143072 A | 7/2012 |
| JP | 201457398 A | 3/2014 |
| JP | 201472945 A | 4/2014 |
| JP | 6420039 B2 | 11/2018 |

* cited by examiner

SYSTEMS AND METHODS FOR CONFIGURABLE BATTERY CHARGING

REFERENCE TO RELATED APPLICATIONS

This application claims priority to and the benefit of U.S. Provisional Patent Application No. 62/519,279, filed on Jun. 14, 2017, and entitled "Systems and Methods for Improved Battery Charging." The entire contents of the above-referenced application are incorporated herein by reference.

BACKGROUND

The past several decades have seen a steady increase in the number of unmanned underwater robotic systems deployed for use in the ocean. These underwater systems rely on a plurality of battery units, which need to be charged. By having fixed installations, e.g., charging stations on the sea floor, unmanned underwater vehicles could recharge periodically without the need to resurface. These charging stations on the sea floor could include a hydrogen or oxygen cell with a fixed output to slowly charge the batteries of the unmanned underwater vehicle currently docked. Ideally, when charging the same voltage, current and polarity can be found on the charger and the charging device. However, if there is a large difference in voltage between the charger and the charging device, the charging device may have a shortened life or experience immediate damage.

Figure 1A:
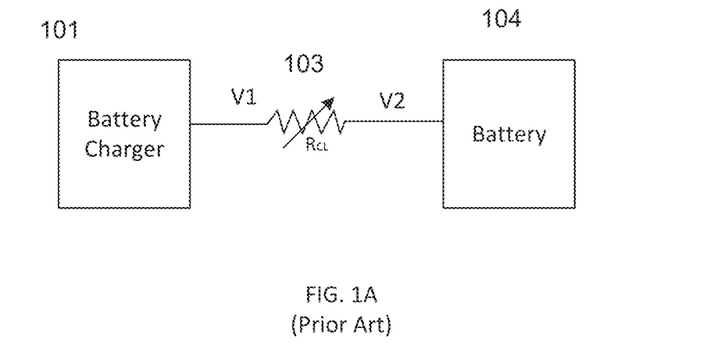
FIG. 1A is a block diagram of a prior art battery charging system.

As illustrated in FIG. 1, conventional battery charging systems often rely on a current limiting resistor ($R_{CL}$) that reduces the voltage output ($V_1$) from the battery charger to a voltage ($V_2$) that is input to a target battery for charging. In this way, the current limiting resistor $R_{CL}$ enables a mismatch in the output voltage $V_2$ of the battery charger with the input voltage of the target battery to, thereby, enable the battery charger to charge batteries of different voltage ratings than the battery charger. The resistance of the current limiting resistor $R_{CL}$ can be variable to enable the battery charger to charge batteries having different voltage ratings. One significant disadvantage to this implementation is the substantial loss in energy, much of which being in the form of emitted thermal energy or heat, due to the drop in voltage and reduction in current caused by the current limiting resister $R_{CL}$. Hence, there is a need for enabling more efficient and flexible charging of batteries of different capacities or ratings in a way that reduces energy loss during the charging process.

Typical methods for charging batteries include charging battery cells in series. Again, this may result in a mismatch between the voltage across the battery pack (comprising a fixed number of battery cells), and the voltage provided by the charger. As such, a need exists for a more granular method of charging battery packs, including battery packs present in underwater robotic systems.

SUMMARY

Systems and methods are described herein for utilizing reconfigurable battery charging systems or battery systems to enable more efficient and flexible charging of batteries. According to one aspect, a system for charging a battery set comprises a docking station with a first plurality of batteries, each battery including a first plurality of battery cells, a controller, and an interface arranged to enable charging of the battery set having a second one or more batteries, each battery including a second plurality of battery cells. One or more electrical connections between batteries of the first plurality of batteries can be configurable. The controller can be arranged to configure the one or more electrical connections between the batteries of the first plurality of batteries to generate a first charging voltage. The first charging voltage can meet a charging requirement of the second one or more batteries. The battery set may be included in an autonomous vehicle such as, for example, an AUV or UAV. A battery set is understood to include one or more batteries.

According to one aspect, a first battery of the second one or more batteries is a two-cell battery and a second battery of the second one or more batteries is a four-cell battery. The first battery and the second battery can be charged in parallel and then connected in series to charge a third battery of the second one or more batteries. In one configuration, the second one or more batteries further comprises a first plurality of switches and a second plurality of switches. In one implementation, the first plurality of switches are closed and the second plurality of switches are open during a series connection between a first battery and a second battery. In another implementation, the first plurality of switches are open and the second plurality of switches are closed during a parallel connection between a first battery and a second battery.

According to another aspect, a method for charging a battery set, comprises determining charging requirements of the battery set, connecting a plurality of batteries in a first combination to match the charging requirements of the battery set; and charging the battery set using the plurality of batteries in the first combination. According to one implementation, the method further comprises charging a first plurality of batteries of the battery set in parallel. The first plurality of batteries of the battery set can be combined in series to charge a second plurality of batteries of the battery set. According to one configuration, the method further comprises determining second charging requirements associated with a second battery set, connecting the plurality of batteries in a second combination to match the second charging requirements, and charging the second battery set using the plurality of batteries in the second combination. The second battery set may be included in a second autonomous vehicle.

According to one implementation, determining the charging requirements of the battery set further comprises detecting the battery set approaching a charging station, receiving at the charging station information from the battery set and/or an associated vehicle in which the battery set resides, and determining the charging requirements of the battery set based on the information. According to one implementation, the method further comprises establishing a connection between the battery set and the charging station. According to one configuration, the information comprises a charging voltage.

According to another implementation, determining the charging requirements of the battery set may include determining a temperature based on at least one of a temperature of a volume of water surrounding the battery set, a battery of the battery set, and a battery cell of a battery of the battery set. Then, determining the charging requirements of the battery set based on the temperature.

According to yet another aspect, a method for charging a battery set comprises detecting a target docking station, determining charging capabilities associated with the target docking station, connecting a plurality of batteries in a combination to match the charging capabilities of the target docking station, and charging the battery set using the plurality of batteries in the combination.

In one implementation, determining the charging capabilities associated with the target docking station further comprises receiving, at the battery set, information from the target docking station and determining the charging capabilities associated with the target docking station based on the information. The information may include whether the target docking station is available and functional. The information may include a maximum charging voltage. In one implementation, the method further comprises navigating to a specific location. According to one aspect, the target location is located at the specific location. The battery combination may include any one of a series combination and a parallel combination.

According to yet another aspect, a method for charging and discharging a battery including a plurality of cells comprises arranging a first cell and second cell in a parallel circuit between a power source and ground, the first cell and second cell having the same output voltage capacity, and charging the first cell and second cell in parallel to substantially the output voltage capacity. The method also comprises disconnecting the first cell and second cell from the power source, arranging the first cell and second cell in a series circuit between an output terminal of the battery and ground such that the voltage capacity of battery is substantially double the output voltage capacity of the first cell and second cell, and discharging the battery at the voltage capacity of the battery.

In various aspects, a charging system may be implemented within an independent charging station or within an autonomous vehicle. Binary charging can be used to obtain the desired charge or discharge voltage for charging an autonomous vehicle at a charging station. By combining a subset of a sequence of batteries arrays that approximately differ in voltage by powers of two in series, where each battery array may include multiple batteries or battery cells, a voltage may be obtained which is equal to the sum of the voltages across each battery array. The set of switches that are on may be thought of as a binary number, with the resulting voltage being approximately that number multiplied by the voltage of the lowest battery voltage (in practice this is inexact due to diode protection). This voltage may be used in turn to charge additional batteries or battery arrays. The process may be repeated until the desired amount of battery arrays has been charged and the desired voltage has been achieved. It is worth noting that the batteries may differ from having voltages that differ by powers of two because they may have diode protection, so a single cell battery might be 3.5V−0.7V=2.8V, a two cell battery might be 2×3.5V−0.7V=6.3V, a four cell battery might be 4×3.5V−0.7V=13.3V, and so on.

Other objects, features, and advantages of the present invention will become apparent upon examining the following detailed description, taken in conjunction with the attached drawings.

BRIEF DESCRIPTION OF THE FIGURES

The systems and methods described herein are set forth in the appended claims. However, for purpose of explanation, several illustrative aspects are set forth in the following figures.

DETAILED DESCRIPTION

FIG. 1A is a block diagram of a prior art battery charging system. A battery charger 101 is connected to a battery 104. The battery charger may be rated to a voltage V1, and the battery may be rated to a voltage V2. The connection 103 may be an RLC circuit including various circuit elements such as a resistor, inductor or capacitor, connected in series or parallel, with an effective resistance $R_{LC}$.

To provide an overall understanding of the invention, certain illustrative aspects will now be described. However, it will be understood by one or ordinary skill in the art that the systems and methods described herein can be adapted and modified for other suitable applications and that such other additions and modifications will not depart from the scope hereof.

According to one aspect, a charging system for charging an autonomous vehicle comprises a docking station with a first plurality of batteries, each battery including a first plurality of battery cells, and an autonomous vehicle with a second plurality of batteries, each battery including a second plurality of battery cells. The first plurality of batteries can be connected to generate a first charging voltage which is compatible with a voltage across the second plurality of batteries. In some aspects, a first battery of the second plurality of batteries is a two-cell battery, and a second battery of the second plurality of batteries is a four-cell battery. The first battery and the second battery are charged in parallel and then connected in series to charge a third battery of the second plurality of batteries.

According to another aspect a method for charging an autonomous vehicle, comprises determining charging requirements of the autonomous vehicle, connecting a plurality of batteries in a first combination to match the charging requirements of the autonomous vehicle; and charging the autonomous vehicle using the plurality of batteries in the first combination.

In some aspects, the method further comprises charging a first plurality of batteries of the autonomous vehicle in parallel, wherein the first plurality of batteries of the autonomous vehicle can be combined in series to charge a second plurality of batteries of the autonomous vehicle.

In some aspects, the method further comprises determining second charging requirements associated with a second autonomous vehicle, connecting the plurality of batteries in a second combination to match the second charging requirements, and charging the second autonomous vehicle using the plurality of batteries in the second combination.

According to another aspect, a method for charging an autonomous vehicle comprises determining charging requirements of the autonomous vehicle, connecting a plurality of batteries in a first combination to match the charging requirements of the autonomous vehicle, and charging the autonomous vehicle using the plurality of batteries in the first combination.

In some aspects, the method further comprises determining second charging requirements associated with a second autonomous vehicle, connecting the plurality of batteries in a second combination to match the second charging requirements, and charging the second autonomous vehicle using the plurality of batteries in the second combination.

According to another aspect, a method for charging and discharging a battery including a plurality of cells comprises arranging a first cell and second cell in a parallel circuit between a power source and ground, the first cell and second cell having the same output voltage capacity, and charging the first cell and second cell in parallel to substantially the output voltage capacity. The method also comprises disconnecting the first cell and second cell from the power source, arranging the first cell and second cell in a series circuit between an output terminal of the battery and ground such that the voltage capacity of battery is substantially double the output voltage capacity of the first cell and second cell, and discharging the battery at the voltage capacity of the battery.

Figure 2:
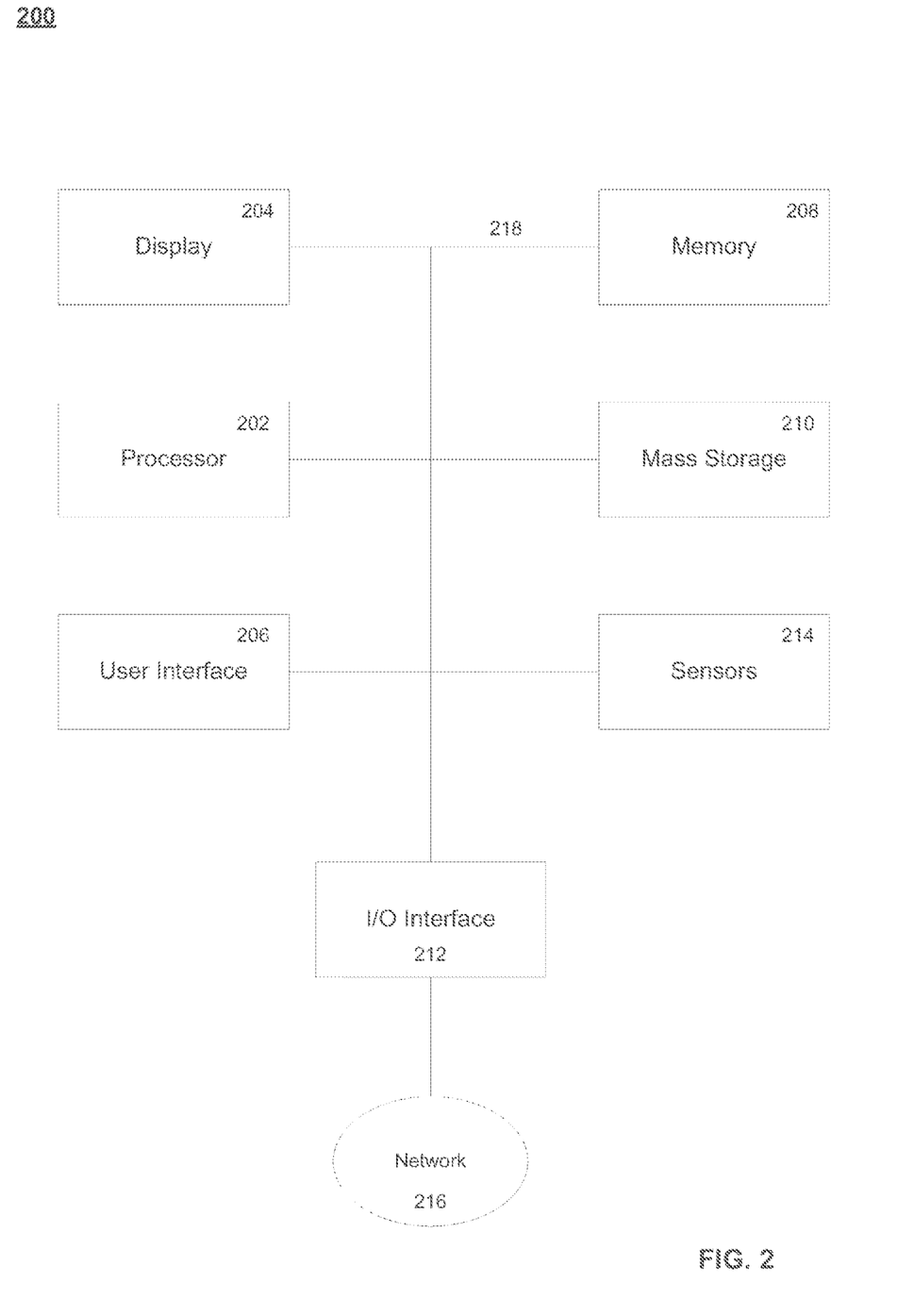
FIG. 2 is a block diagram of an exemplary computer system for implementing at least a portion of the systems and methods described in the present disclosure.
Figure 3:
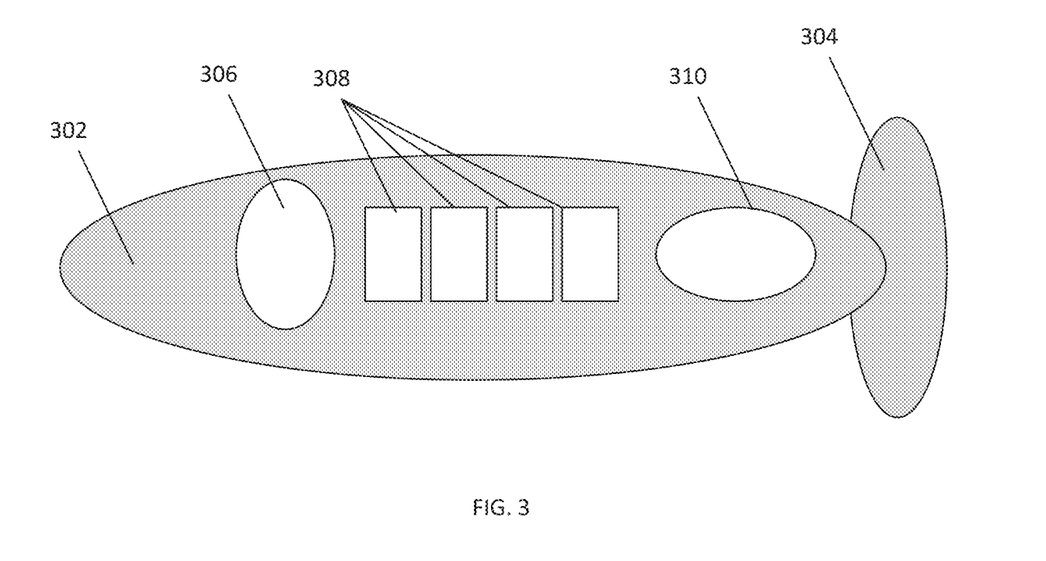
FIG. 3 is a block diagram depicting an exemplary remote vehicle, according to an illustrative aspect of the present disclosure.

FIG. 3 is a block diagram depicting an exemplary remote vehicle, according to an illustrative aspect of the present disclosure. Such an exemplary remote or autonomous vehicle includes a main body 302, along with a drive unit 304. For example, the drive unit 304 may be a propeller. The remote vehicle includes internal components, which may be located within different compartments within the main body 302. For example, the main body 302 may house a component 306. For example, the component 306 may be a sonar unit. Similarly, the main body 302 may house a component 310, which may include a computer system, as described for example in FIG. 1B and FIG. 2. In addition, the remote or autonomous vehicle includes a power generating system 308. For example, the power generating system 308 may be a stack of battery elements, each comprising a stack of battery cells.

Batteries/Battery Cells

Large batteries use large arrays of cells. A series connection (with or without other parallel connections) may be required to meet specific power requirements. Any imbalance between cells may affect battery performance. If charging cells in series, charging is only desirable until one of the cells reaches its maximum cell voltage—proceeding with charging beyond that point would result in cell damage and/or may cause fire or explosion through the battery.

A vehicle, for example an underwater vehicle, may be powered by an array of battery packs, each battery pack comprising battery cells. These battery cells may comprise any suitable battery for providing energy to a vehicle, including, but not limited to, any suitable battery chemistry, a lithium battery, lithium-ion battery, lithium polymer battery, or a lithium sulfur battery. The battery cells 402 may be in a matrix, or the battery cells may be arranged, aligned, or positioned in any suitable arrangement. In some aspects, the battery cells may be stacked on top of each other. In such aspects, the battery cells may include a separator between each vertically-stacked cell. The one or more battery cells may be positioned on a tray, wherein the tray provides structural support, alignment, and electrical insulation for the one or more battery cells. A backplane may connect the battery cells to management circuitry, described in further detail below. In alternate aspects, battery cells may be directly connected to the management circuitry. In some aspects, the battery cells may be connected to management circuitry through a communication network. A communication network may be any suitable network for communicating control signals. The management circuitry may comprise a pressure tolerant circuit board that may be manually programmed using any suitable programming language. In some aspects, a temperature sensor may be connected to the battery cells, either directly or through backplane. The battery cells may be configured to communicate cell health information, including at least a voltage and temperature, to the management circuitry. The management circuitry may include a water-intrusion detection circuit board, which may comprise a conductive trace that drops in resistance in the presence of water.

The primary factors that affect mission duration and sensor payload capability of an autonomous vehicle include the performance of the battery modules, including their ability to charge and discharge. Equally important for certain cell chemistries (e.g., Lithium Ion) is circuitry used in the management of the battery components. A battery manager (BMGR) may be configured to interface with the outside world and to protect the battery (by disconnecting the charge input and/or discharge output) if voltage or temperature safety limits are exceeded. The BMGR may shut down the battery immediately if it detects any individual cell voltage above the max cell voltage, or if any individual cell temperature exceeds a manufacturer recommended maximum temperature. The BMGR may disable charging of the battery system if any cell temperature is below a manufacturer recommended minimum temperature. The BMGR may disable discharging of the battery system if any cell temperature is below a manufacturer recommended minimum temperature for discharge, which may differ from the charge limit temperature. An over-discharge protection feature may be activated at any time, which will also shut down the battery if any individual cell voltage drops below a manufacturer recommended minimum cell voltage. To prevent an overcurrent condition, the battery system may be equipped with a pressure tolerant fuse in series with the positive terminal, and the BMGR may provide a controllable dual disconnect (high and low side switches). Further details regarding an exemplary pressure tolerant fuse are provided in U.S. Patent Application Publication No. 2012/0281503, the entire contents of which are incorporated herein by reference. This provides a safety feature by requiring two concurrent failures to happen before an uncommanded output voltage can be presented at the battery output.

Battery Charging Station

A battery charging station may comprise suitable systems for charging batteries for the multiple vehicles on the ship, such as lithium-ion batteries, lithium-polymer batteries, lithium-sulfur batteries, nickel metal hydride batteries, silver-zinc, or any other suitable chemistry. The battery charging station may include additional backup cells that may be switched out for failed cells on any of the vehicles. The battery charging station may be hooked into the power generation unit of the main vessel. The battery charging station may optionally include a refueling station for the vessel engines or fuel cells. Similarly, the modular power generation unit may be used to augment the vessel's power system. The modular power generation unit may comprise a fossil fuels-based system, a nuclear power generator, a solar panel, a gas turbine, or any other suitable power generation system. The database for storing received data from the vehicle(s) may comprise a typical computer system or a specialized database for processing data from the vehicle(s). The database may be deployed as part of, or separate from, the modular processing and data center. As an illustrative aspect, the database and/or modular processing data center may comprise a typical computing system running a Windows operating system, or any other suitable operating system for analyzing data received from the vehicle.

Battery charging stations may be integrated within a system for launching, recovering and handling autonomous vehicle from a ship. Alternatively, battery charging stations may be integrated with a permanent underwater station to enable lower cost ocean surveys or rig maintenance. Such a station may include multiple vehicles to dock, charge their batteries according to mission specifications, and leave the station to return to operations. The battery charging station may comprise suitable systems for charging batteries for multiple autonomous vehicles, such as lithium-ion batteries, lithium-polymer batteries, lithium-sulfur batteries, nickel metal hydride batteries, silver-zinc, or any other suitable battery chemistry. The battery charging station may include additional backup cells that may be switched out for failed cells on any of the vehicles. The battery charging station may be hooked into a power generation unit of a vessel. The battery charging station may draw his power from an alternate energy source, such as hydrogen fuel cells.

Binary Charger

During charge and discharge operations, it is desirable to be able to control battery output with precision. Excessive voltage can cause breakdown and arcing. Passive components have a specific fixed resistance, excess current can cause overheating and burn through. For example, for an autonomous vehicle in operation, it is desirable to efficiently control discharge of the battery cells. Similarly, in charging the autonomous vehicle, for example after the autonomous vehicle has docked to a charging station, it is desirable to efficiently control a charge of the battery cells to reduce the charging time and/or optimize the charge levels of each cell. By controlling the output of each cell within the battery, a more granular control of the overall battery output can be achieved, allowing a charge to be carried out one battery cell at a time if so desired.

To safely charge or discharge batteries with an arbitrary voltage, internal resistance, and current limit, "Binary Charging", can be used to obtain the desired charge or discharge voltage. A battery array typically includes multiple battery cells, stacked together. In some aspects, a battery array can include batteries with a single (1) cell, batteries with two (2) cells, batteries with four (4) cells, batteries with eight (8) cells and batteries with sixteen (16) cells in series. In other aspects, battery arrays may exist with different numbers of cells.

By combining multiple battery arrays together in series, a maximum voltage can be obtained which is equal to the sum of the voltages across each battery array. In some aspects, this could allow for granular charging of an autonomous vehicle, for example docked to a charging station.

In one aspect, two battery cells are simultaneously charged to the same voltage in parallel, for example from a DC power supply source. The power supply is then switched off and the cells are switched into series. The output taken from across the two cells in series resulting in an output double the supply voltage. This is similar to capacitor cascades, where capacitors are connected in parallel and can then be connected in series by spark caps, to quickly multiply voltage. For example, two 1-cell arrays and a 2-cell array can be charged in parallel. All three cell arrays (the two 1-cell arrays and the 2-cell array) can then be connected in series to obtain a 4V voltage, which can in turn be used to charge a 4-cell battery array. By repeating the charging process of the two 1-cell arrays and the 2-cell array, the system now includes a fully charged 4-cell battery array, two 1-cell arrays and a 2-cell array, generating a combined 8V voltage. Similarly, the charging operating can be repeated to charge the battery arrays in parallel before combining them in series to charge the 16-cell array. Accordingly the voltage can be doubled during each charge.

Figure 4A:
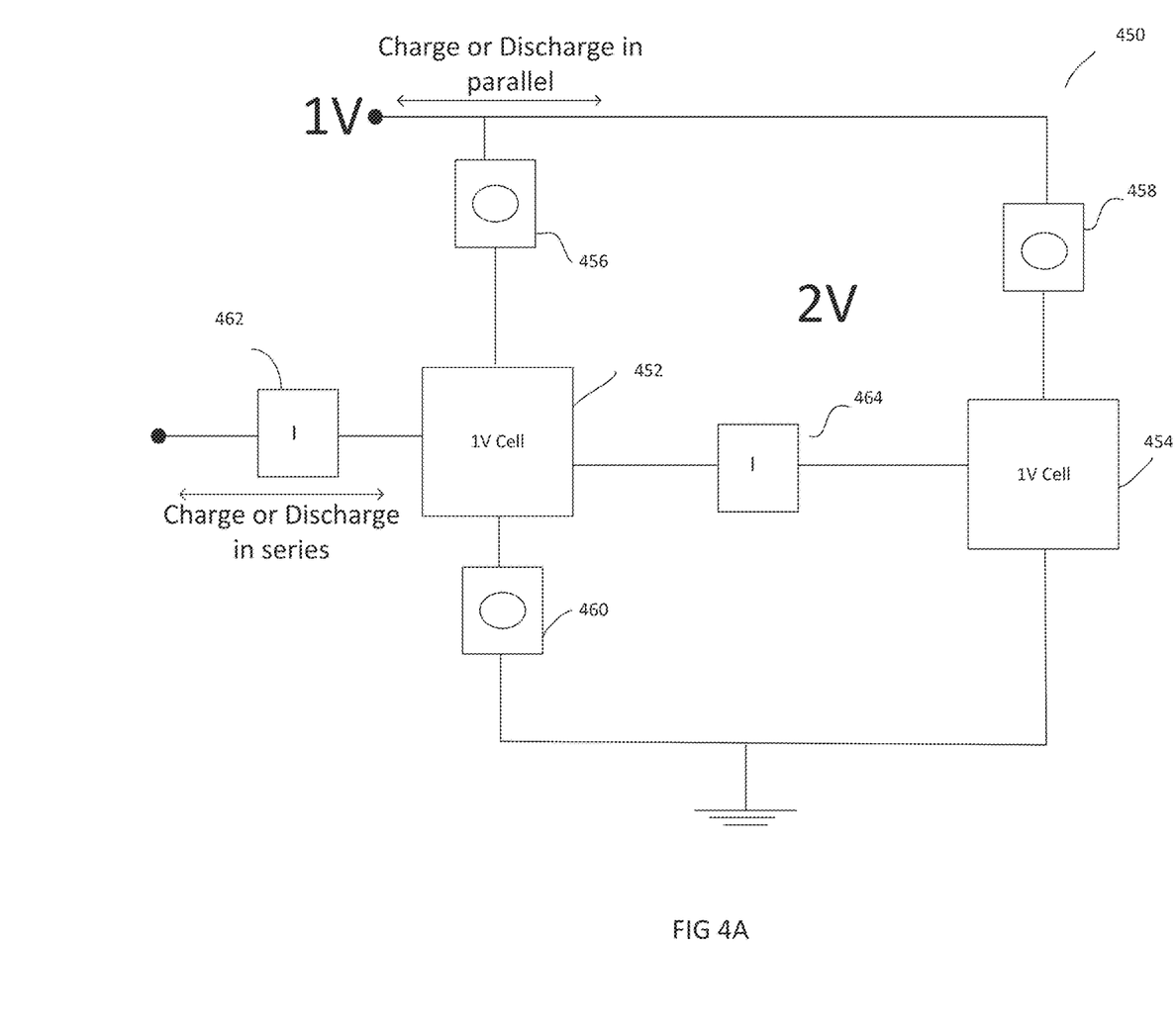
FIG. 4A is a block diagram of an exemplary reconfigurable 2-cell battery.

FIG. 4A is a block diagram of an exemplary reconfigurable 2-cell battery 450. The battery 450 includes 1-volt cells 452 and 454. The battery 450 includes parallel charge/discharge switches 456, 458, and 460 for parallel connections. The battery 450 also includes series charge/discharge switches 462 and 464 for series connections. When configured for series charge/discharge, switches 462 and 464 (i.e., connections) are closed, while switches 456, 458, and 460 (i.e., connections) are open. When configured for parallel charge/discharge, switches 456, 458, and 460 are closed, while switches 462 and 464 are open. The switches may be electronically solenoid operated, hydraulically operated, or manually operated.

In operation, if a 1V power source is available, the battery 450 may be arranged in a parallel configuration (e.g., switches 456, 458, and 460 closed, while switches 462 and 464 are open) so that each 1 volt cell 452 and 454 are charged to 1 Volt. The parallel configuration may be maintained to provide high current 1 Volt discharge from both 1-volt cells in parallel. Alternatively, the battery 450 may be re-arranged into a series configuration (e.g., switches 456, 458, and 460 open, while switches 462 and 464 are closed) so that the output of each 1 Volt cell 452 and 454 are combined to provide a 2 Volt output from the battery 450. While 1-Volt cells are described herein, one of ordinary skill in the art readily recognizes that this approach to combining battery cells in series to increase battery output voltage applies to battery cells of any output voltage. Hence, two 2-volt cells may be combined in series to form a 4-volt battery and so on.

Figure 4B:
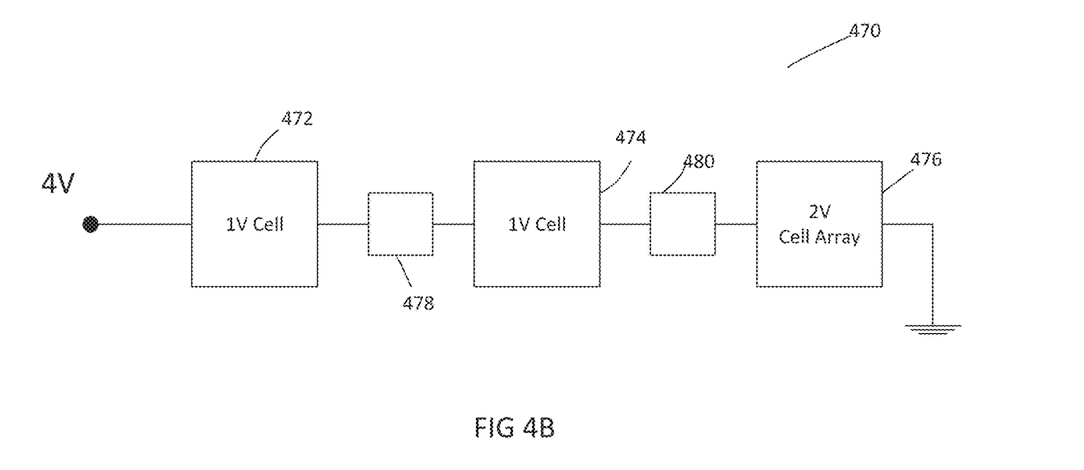
FIG. 4B is a block diagram of an exemplary 4 volt battery derived from a series arrangement of two 1 volt batteries and a 2 volt battery.

FIG. 4B is a block diagram of an exemplary 4-volt battery 470 derived from a series arrangement of two 1-volt batteries 472 and 474 with a 2-volt battery 476. The batteries 472, 474, and 476 may be arranged in series by closing switches 478 and 480.

Figure 4C:
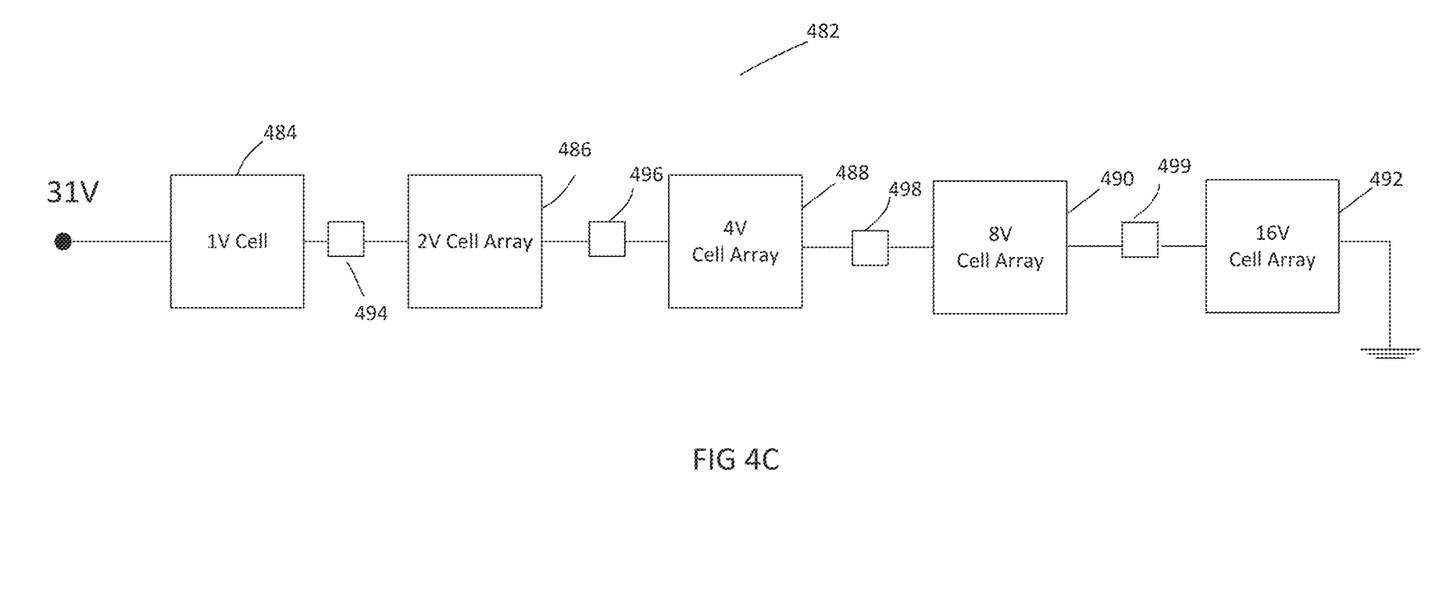
FIG. 4C is a block diagram of an exemplary 31 volt battery derived from a series arrangement of 1 volt, 2 volt, 4 volt, 8 volt, and 16 volt batteries.

FIG. 4C is a block diagram of an exemplary 31-volt battery 482 derived from a series arrangement of 1-volt, 2-volt, 4-volt, 8-volt, and 16-volt batteries 484, 486, 488, 490, and 492. The batteries 484-492 may be arranged in series by closing switches 494, 496, 498, and 499.

Figure 5:
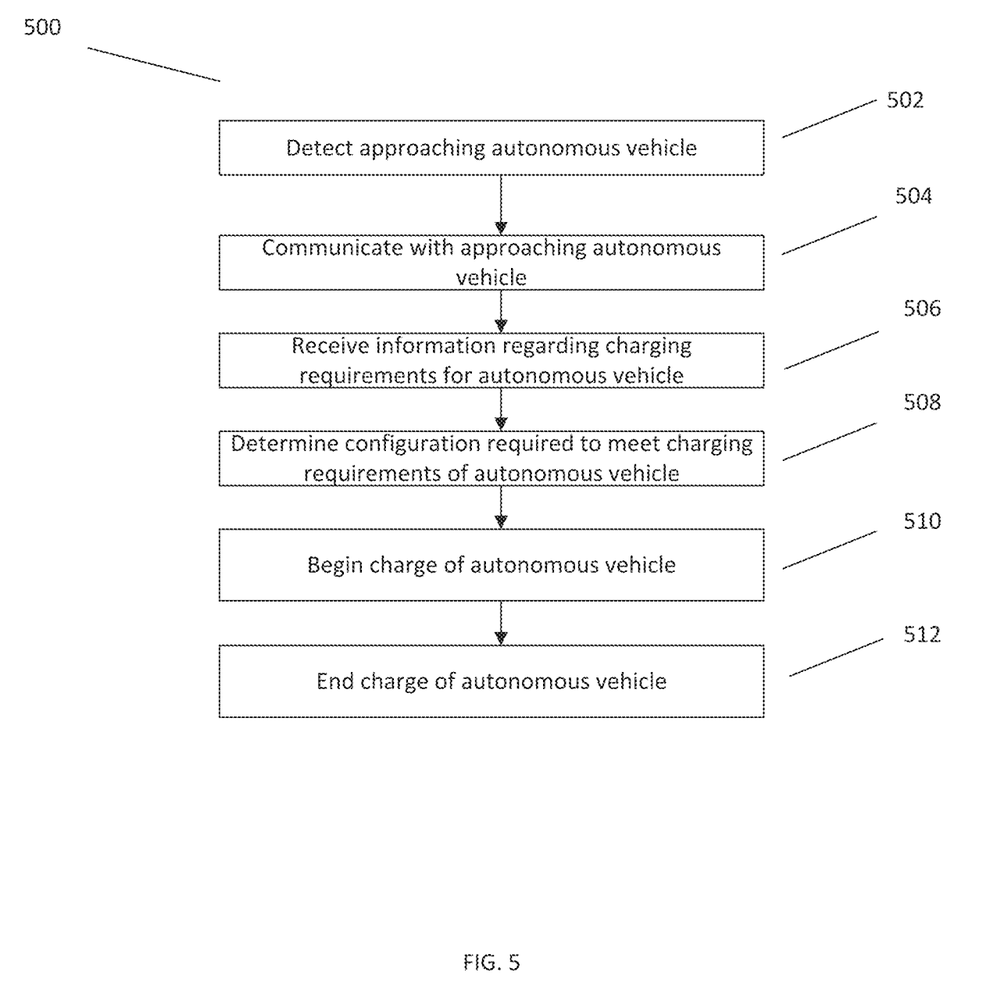
FIG. 5 is a first charging method according to an illustrative aspect of the present disclosure.

In a first aspect, as shown for example in FIG. 5, the charging station may communicate with the autonomous vehicle to request and receive the specifications of the autonomous vehicle, before determining how to match the voltage specifications of the battery packs on the autonomous vehicle by combining one or more battery arrays. As shown in FIG. 5, which describes a charging process 500, an initial step may be to detect an approaching autonomous vehicle. The exemplary charging process 500 may be carried out by one of the exemplary computer systems described in relation to FIG. 1B or FIG. 2. For example, the charging station system may detect an approaching autonomous vehicle. After detecting that an autonomous vehicle is approaching, the following method step 504 may be to communicate with the approaching autonomous vehicle. Because a charging station may be larger and more complex than a single autonomous vehicle, it may be easier to reconfigure voltage at the charging station rather than on the autonomous vehicle. Alternatively, as described in a second aspect below, the autonomous vehicle may reconfigure its voltage requirement as a function of the charging station requirements.

In the first aspect, assuming for example that a standard battery cell has a 1V potential, the maximum voltage that may be obtained from a combination of a 1-cell battery, a 2-cell battery, a 4-cell battery, an 8-cell battery, and an 16-cell battery would be 31 Volts, as a result of combining these battery arrays together in series. In some aspects, a 1-cell battery and a 2-cell battery could be charged in series to obtain 3 Volts. In another aspect, a 16-cell battery and a 4-cell battery could be combined to obtain 20 Volts. Cell by cell charge control enables granular (e.g., 1V) control of each battery output voltage, and of the output voltage as a whole. In an exemplary aspect, an autonomous vehicle may require a 300V charge, and the charging station may detect this charge requirement and configure its battery arrays to match any one of a range of voltages, including the required voltage for a particular autonomous vehicle being charged. Tailoring the voltage of the charging station helps avoid a situation where the autonomous vehicle is being charged with a voltage that is too high, which can lead to overheating, fires and/or damage to the batteries. At step 506, information may be received regarding the charging requirements for the approaching autonomous vehicle. For example, the autonomous vehicle may require a charging voltage of 300 Volts. At step 508, based on the information received regarding the charging requirements, the system may determine a configuration required to meet the charging requirements of the autonomous vehicle. For example, as discussed above, the system may determine how many batteries and which types of batteries to utilize to combine a total number of battery cells providing the desired charging voltage, for example 300 Volts. At step 510, taking into account the configuration required to meet the charging requirements of the autonomous vehicle, the system may begin the charge of the autonomous vehicle.

In some aspects the system may initiate the charge of the autonomous vehicle by charging batteries in parallel. Alternatively, the system may initiate the charge of one of the batteries of the autonomous vehicle, with each battery in turn charging additional batteries, in series, as described above—with cells being charged in parallel and subsequently being combined in series to provide a higher voltage. In one aspect, the set of discharging batteries is changed as the charging battery is charged in order to maintain a low voltage differential. At step 512, the system may end the charge of the autonomous vehicle. For example, the system may determine that the autonomous vehicle has been fully charged, or may alternatively determine that the charging requirements for the autonomous vehicle have been met. In another example, the system may determine that the charging process should be interrupted.

The charging station may have additional capabilities to further refine the charging conditions based on the device to be charged and the surrounding conditions. For example, in some aspects the charging station may include a temperature detection module. In the event of colder temperatures, the charging station may adapt its charging conditions to account for the colder temperatures and to combine multiple cell arrays into a configuration with the desired voltage.

Figure 6:
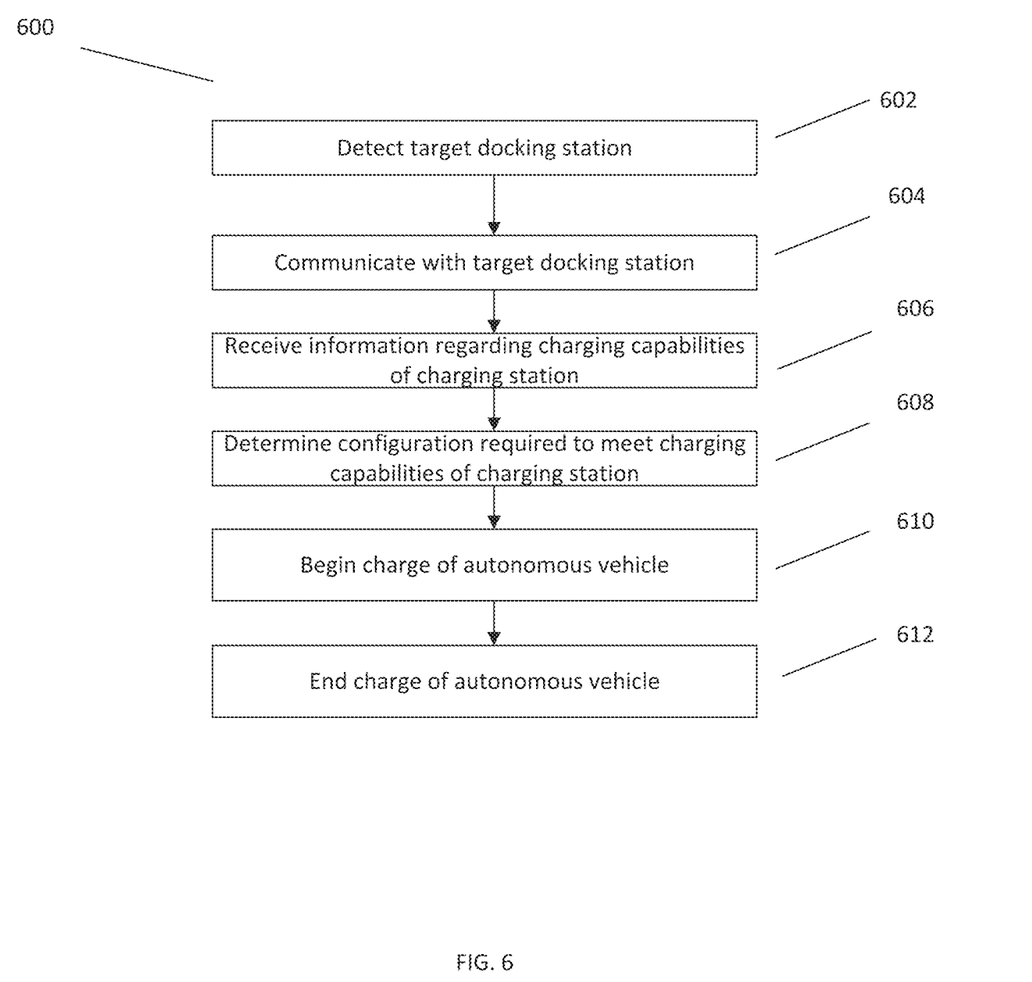
FIG. 6 is a second charging method, according to an illustrative aspect of the present disclosure.

While battery arrays on an autonomous vehicle may be less flexible and less complex than on a semi-permanent or permanent charging station, in some aspects the autonomous vehicle may also be able to self-configure its battery arrays to match a desired charge voltage. In a second aspect, as shown in FIG. 6 which describes a charging process 600, the autonomous vehicle may communicate with the charging station to request and receive the specifications of the charging station, before determining how to match the voltage being provided by making some or all battery arrays and/or battery cells available for charging. An initial step may be to detect a target docking station for recharging.

Figure 1B:
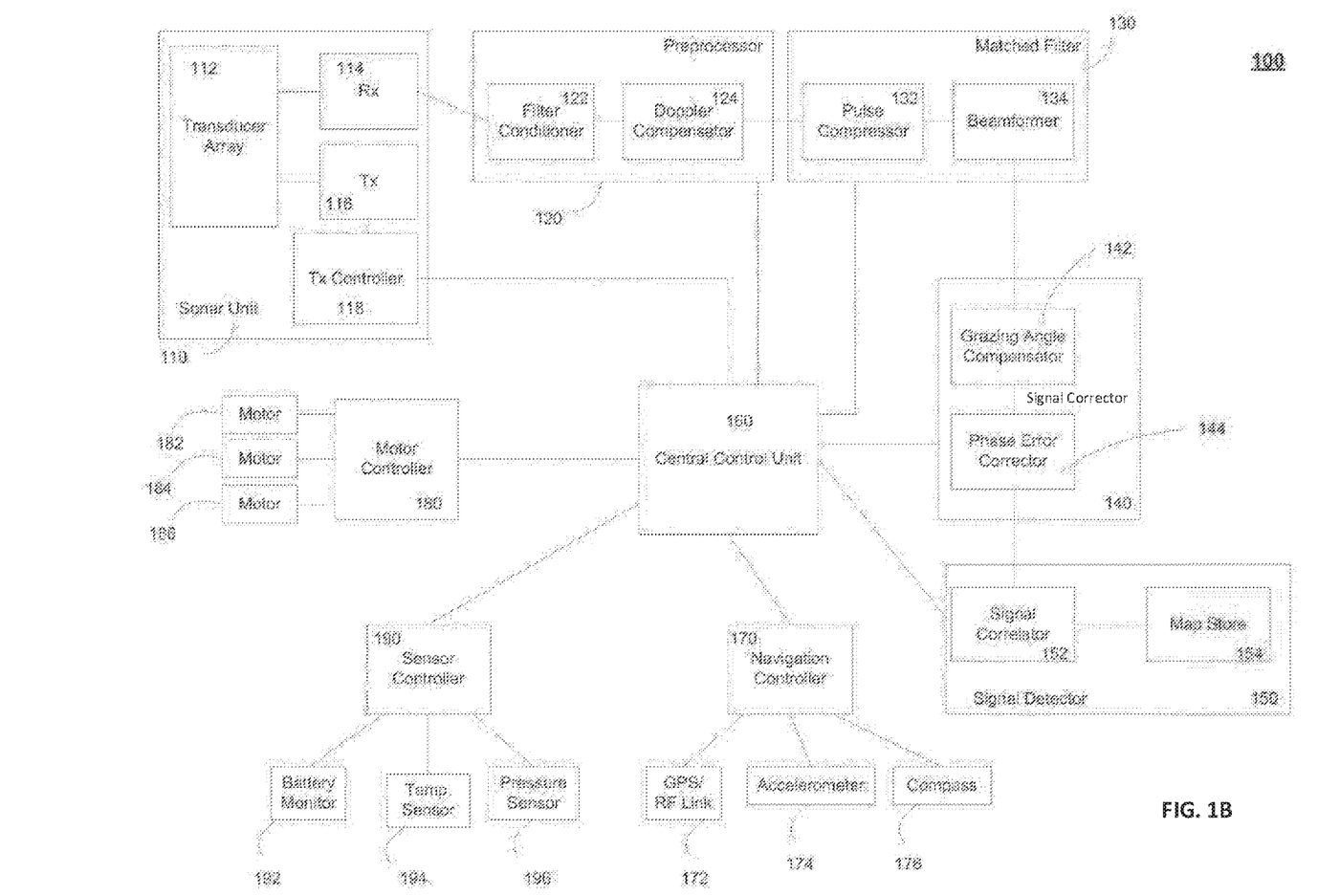
FIG. 1B is a block diagram of an exemplary computer system for implementing at least a portion of the systems and methods described in the present disclosure.

The exemplary charging process 600 may be carried out by one of the exemplary computer systems described in relation to FIG. 1B or FIG. 2. For example, an autonomous vehicle may be programmed to navigate to a specific location and/or a specific target docking station for charging periodically or as necessary based on the autonomous vehicle charge levels. After detecting a target docking station for recharging, the following method step 604 may be to communicate with the target docking station. For example the autonomous vehicle may determine whether the target docking station is available, and whether it is functional. For example, assuming a standard battery cell has a 1V potential, the maximum voltage that may be obtained from a combination of a 1-cell battery, a 2-cell battery, a 4-cell battery, an 8-cell battery, and a 16-cell battery would be 31 Volts, as a result of combining these battery arrays together in series. In some aspects, a 1-cell battery and a 2-cell battery could be charged in series to obtain 3 Volts. In another aspect, a 16-cell battery and a 4-cell battery could be combined to obtain 20 Volts. Cell by cell charge control enables granular (e.g., 1V) control of each battery output voltage, and of the output voltage as a whole.

In an exemplary aspect, a charging station may have a 400V charging capacity, and the autonomous vehicle may detect this charging capacity and configure its battery arrays to match the required voltage. At step 606, information may be received regarding the charging capabilities of the docking station. For example, the docking station may only be able to provide voltage of up to 200 Volts. At step 608, based on the information received regarding the charging capabilities, the system may determine a configuration required to meet the charging capabilities of the docking station. For example, as discussed above, the system may determine how many batteries and which types of batteries to utilize to combine a total number of battery cells and provide the desired voltage to match the charging voltage, for example 200 Volts. At step 610, taking into account the configuration required to meet the charging capabilities of the docking station, the charge of the autonomous vehicle may be initiated. In some aspects the charge of the autonomous vehicle may be implemented by charging the autonomous vehicle batteries in parallel. Alternatively, the batteries of the autonomous vehicle may be charged in cascade, with each battery in turn charging additional batteries, in series. At step 612, the charging of the autonomous vehicle may end. For example, the system may determine that the autonomous vehicle has been fully charged, or may alternatively determine that the charging requirements for the autonomous vehicle have been met. In another example, the system may determine that the charging process should be interrupted.

The autonomous vehicle may have additional capabilities to further refine the charging conditions based on the charging station and the surrounding conditions. For example, in some aspects the autonomous vehicle may include a temperature detection module. In the event of colder temperatures, less current may be desired for the autonomous vehicle, and the autonomous vehicle could allow current to flow through additional diodes. Batteries connected to a diode would result in improved precision on binary operations, with each diode taking up some amount of voltage (e.g., 0.8V per diode). Accordingly, the autonomous vehicle would have to account for the additional voltage differential in determining how to combine multiple cell arrays into a configuration with the desired voltage.

Remote Vehicle

FIG. 1B is a block diagram depicting an illustrative remote vehicle, according to an illustrative aspect of the present disclosure. The system 100 includes a sonar unit 110 for sending and receiving sonar signals, a preprocessor 120 for conditioning a received (or reflected) signal, and a matched filter 130 for performing pulse compression and beamforming. The system 100 is configured to allow for navigating using high-frequency (greater than about 100 kHz) sonar signals. To allow for such HF navigation, the system 100 includes a signal corrector 140 for compensating for grazing angle error and for correcting phase error. The system 100 also includes a signal detector 150 for coherently correlating a received image with a map.

In some aspects, the system 100 includes an on-board navigation controller 170, motor controller 180 and sensor controller 190. The navigation controller 170 may be configured to receive navigational parameters from a GPS/RF link 172 (when available), an accelerometer 174, 10 a gyroscope, and a compass 176. The motor controller 180 may be configured to control a plurality of motors 182, 184 and 186 for steering the vehicle. The sensor controller 190 may receive measurements from the battery monitor 172, a temperature sensor 194 and a pressure sensor 196. The system 100 further includes a central control unit (CCU) 160 that may serve as a hub for determining navigational parameters based on sonar measurements and other navigational and sensor parameters, and for controlling the movement of the vehicle.

In the context of a surface or underwater vehicle, the CCU 160 may determine navigational parameters such as position (latitude and longitude), velocity (in any direction), bearing, heading, acceleration and altitude. The CCU 160 may use these navigational parameters for controlling motion along the along-track direction (fore and aft), a cross-track direction (port and starboard), and vertical direction (up and down). The CCU 160 may use these navigational parameters for controlling motion to yaw, pitch, roll or otherwise rotate the vehicle. During underwater operation, a vehicle such as an AUV may receive high-frequency real aperture sonar images or signals at sonar unit 110, which may then be processed, filtered, corrected, and correlated against a synthetic aperture sonar (SAS) map of the terrain. Using the correlation, the CCU may then determine the AUV's position, with high-precision and other navigational parameters to assist with navigating the terrain. The precision may be determined by the signal and spatial bandwidth of the SAS map and/or the acquired sonar image. In certain aspects, assuming there is at least a near perfect overlap of the sonar image with a prior SAS map with square pixels, and assuming that the reacquisition was performed with a single channel having a similar element size and bandwidth, and assuming little or no losses to grazing angle compensation, the envelope would be about one-half the element size. Consequently, in certain aspects, the peak of the envelope may be identified with high-precision, including down to the order of about 1/100 th of the wavelength. For example, the resolution may be less than 2.5 cm, or less than 1 cm or less than and about 0.1 mm in the range direction.

As noted above, the system 100 includes a sonar unit 110 for transmitting and receiving acoustic signals. The sonar unit includes a transducer array 112 having a one or more transmitting elements or projectors and a plurality of receiving elements arranged in a row. In certain aspects the transducer array 112 includes separate projectors and receivers. The transducer array 112 may be configured to operate in SAS mode (either strip-map or spotlight-mode) or in a real aperture mode. In certain aspects, the transducer array 112 is configured to operate as a multi-beam echo sounder, side-scan sonar or sector-scan sonar. The transmitting elements and receiving elements may be sized and shaped as desired and may be arranged in any configuration, and with any spacing as desired without departing from the scope of the present disclosure. The number, size, arrangement and operation of the transducer array 112 may be selected and controlled to in-sonify terrain and generate high-resolution images of a terrain or object. One example of an array 112 includes a 16 channel array with 5 cm elements mounted in a 12¾ inch vehicle. The sonar unit 110 further includes a receiver 114 for receiving and processing electrical signals received from the transducer, and a transmitter 116 for sending electrical signals to the transducer. The sonar unit 110 further includes a transmitter controller 118 for controlling the operation of the transmitter including the start and stop, and the frequency of a ping. The signals received by the receiver 114 are sent to a preprocessor for conditioning and compensation. Specifically, the preprocessor 120 includes a filter conditioner 122 for eliminating outlier values and for estimating and compensating for hydrophone variations. The preprocessor further includes a Doppler compensator 124 for estimating and compensating for the motion of the vehicle. The preprocessed signals are sent to a matched filter 130.

The matched filter 130 includes a pulse compressor 132 for performing matched filtering in range, and a beam former 134 for performing matched filtering in azimuth and thereby perform direction estimation.

The signal corrector 140 includes a grazing angle compensator 142 for adjusting sonar images to compensate for differences in grazing angle. Typically, if a sonar images a collection of point scatterers the image varies with observation angle. For example, a SAS system operating at a fixed altitude and heading observing a sea floor path will produce different images at different ranges. Similarly, SAS images made at a fixed horizontal range would change if altitude were varied. In such cases, changes in the image would be due to changes in the grazing angle. The grazing angle compensator 142 is configured to generate grazing angle invariant images. One such grazing angle compensator is described in U.S. patent application Ser. No. 12/802,454 titled "Apparatus and Method for Grazing Angle Independent Signal Detection," the contents of which are incorporated herein by reference in their entirety.

The signal corrector 140 includes a phase error corrector 144 for correcting range varying phase errors. Generally, the phase error corrector 144 breaks the image up into smaller pieces, each piece having a substantially constant phase error. Then, the phase error may be estimated and corrected for each of the smaller pieces. The system 100 further includes a signal detector 150 having a signal correlator 152 and a storage 154. The signal detector 150 may be configured to detect potential targets, estimate the position and velocity of a detected object and perform target or pattern recognition. In one aspect, the storage 154 may include a map store, which may contain one or more previously obtained SAS images real aperture images or any other suitable sonar image. The signal correlator 152 may be configured to compare the received and processed image obtained from the signal corrector 140 with one or more prior images from the map store 154.

The system 100 may include other components, not illustrated, without departing from 20 the scope of the present disclosure. For example, the system 100 may include a data logging and storage engine. In certain aspects the data logging and storage engine may be used to store scientific data which may then be used in post-processing for assisting with navigation. The system 100 may include a security engine for controlling access to and for authorizing the use of one or more features of system 100. The security engine may be configured with suitable encryption protocols and/or security keys and/or dongles for controlling access. For example, the security engine may be used to protect one or more maps stored in the map store 154. Access to one or more maps in the map store 154 may be limited to certain individuals or entities having appropriate licenses, authorizations or clearances. Security engine may selectively allow these individuals or entities access to one or more maps once it has confirmed that these individuals or entities are authorized. The security engine may be configured to control access to other components of system 100 including, but not limited to, navigation controller 170, motor controller 180, sensor controller 190, transmitter controller 118, and CCU 160. Generally, with the exception of the transducer 112, the various components of system 100 may be implemented in a computer system, such as computer system 200 of FIG. 2.

FIG. 2 is a functional block diagram of a general purpose computer accessing a network according to an illustrative aspect of the present disclosure. The holographic navigation systems and methods described in this application may be implemented using the system 200 of FIG. 2.

Navigation Systems and Methods

The exemplary system 200 includes a processor 202, a memory 208, and an interconnect bus 218. The processor 202 may include a single microprocessor or a plurality of microprocessors for configuring computer system 200 as a multi-processor system. The memory 208 illustratively includes a main memory and a read-only memory. The system 200 also includes the mass storage device 210 having, for example, various disk drives, tape drives, etc. The main memory 208 also includes dynamic random access memory (DRAM) and high speed cache memory. In operation and use, the main memory 208 stores at least portions of instructions for execution by the processor 202 when processing data (e.g., model of the terrain) stored in main memory 208.

In some aspects, the system 200 may also include one or more input/output interfaces for communications, shown by way of example, as interface 212 for data communications via the network 216. The data interface 212 may be a modem, an Ethernet card or any other suitable data communications device. The data interface 212 may provide a relatively high-speed link to a network 216, such as an intranet, internet, or the Internet, either directly or through another external interface. The communication link to the network 216 may be, for example, any suitable link such as an optical, wired, or wireless (e.g., via satellite or 802.11 Wi-Fi or cellular network) link. In some aspects, communications may occur over an acoustic modem. For instance, for AUVs, communications may occur over such a modem.

Alternatively, the system 200 may include a mainframe or other type of host computer system capable of web-based communications via the network 216. In some aspects, the system 200 also includes suitable input/output ports or may use the Interconnect Bus 218 for interconnection with a local display 204 and user interface 206 (e.g., keyboard, mouse, touchscreen) or the like serving as a local user interface for programming and/or data entry, retrieval, or manipulation purposes. Alternatively, server operations personnel may interact with the system 200 for controlling and/or programming the system from remote terminal devices (not shown in the Figure) via the network 216.

In some aspects, a system requires a processor, such as a navigational controller 170, coupled to one or more coherent sensors (e.g., a sonar, radar, optical antenna, etc.) 214. Data corresponding to a model of the terrain and/or data corresponding to a holographic map associated with the model may be stored in the memory 208 or mass storage 210, and may be retrieved by the processor 202. Processor 202 may execute instructions stored in these memory devices to perform any of the methods described in this application, e.g., grazing angle compensation, or high frequency holographic navigation.

The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In some aspects, the system requires a processor coupled to one or more coherent sensors (e.g., a sonar, radar, optical antenna, etc.) 214. The sensor array 214 may include, among other components, a transmitter, receive array, a receive element, and/or a virtual array with an associated phase center/virtual element.

Data corresponding to a model of the terrain, data corresponding to a holographic map associated with the model, and a process for grazing angle compensation may be performed by a processor 202. The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In operation, a processor 202 receives a position estimate for the sensor(s) 214, a waveform or image from the sensor(s) 214, and data corresponding to a model of the terrain, e.g., the sea floor. In some aspects, such a position estimate may not be received and the process performed by processor 202 continues without this information. Optionally, the processor 202 may receive navigational information and/or altitude information, and a processor 202 may perform a coherent image rotation algorithm. The output from the system processor 202 includes the position to which the vehicle needs to move to. The components contained in the system 200 are those typically found in general purpose computer systems used as servers, workstations, personal computers, network terminals, portable devices, and the like.

In fact, these components are intended to represent a broad category of such computer components that are well known in the art.

It will be apparent to those of ordinary skill in the art that methods involved in the systems and methods of the invention may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system. FIG. 3A depicts an illustrative pressure vessel component. Pressure vessel component 300 may comprise gross pressure vessel component 302 and one or more bosses 304.

What is claimed is:

1. A system for charging a battery set of an autonomous vehicle comprising:
    a docking station with a first plurality of batteries, each battery including a first plurality of battery cells, wherein one or more electrical connections between batteries of the first plurality of batteries are configurable;
    a controller arranged to receive a communication from the autonomous vehicle including a charging requirement of the battery set and, in response to the communication, configure the one or more electrical connections between the batteries of the first plurality of batteries to generate a first charging voltage, wherein the charging requirement includes a setting for the first charging voltage; and
    an interface arranged to enable charging of the battery set of the autonomous vehicle having a second one or more batteries, each battery including a second plurality of battery cells, wherein the first charging voltage meets the charging requirement of the battery set of the autonomous vehicle.

2. The charging system of claim 1,
    wherein a first battery of the second one or more batteries is a two-cell battery, and a second battery of the second one or more batteries is a four-cell battery, and
    wherein the first battery and the second battery are charged in parallel and then connected in series to charge a third battery of the second one or more batteries.

3. The charging system of claim 2, wherein the second one or more batteries further comprises a first plurality of switches and a second plurality of switches.

4. The charging system of claim 3, wherein the first plurality of switches are closed and the second plurality of switches are open during a series connection between the first battery and the second battery.

5. The charging system of claim 3, wherein the first plurality of switches are open and the second plurality of switches are closed during a parallel connection between the first battery and the second battery.

6. A method for charging a battery set of an autonomous vehicle, the method comprising:
    detecting a target docking station;
    determining charging capabilities associated with the target docking station based on information communicated from the target docking station;
    in response to the communicated information, connecting a plurality of batteries of the battery set in a combination to match the charging capabilities of the target docking station; and
    charging the battery set while the plurality of batteries are connected in the combination.

7. The method of claim 6, further comprising receiving, at the battery set, the information from the target docket station.

8. The method of claim 6, wherein the information includes whether the target docking station is available and functional.

9. The method of claim 6, wherein the information comprises a maximum charging voltage.

10. The method of claim 6, further comprising navigating to a specific location.

11. The method of claim 6, wherein the target docking station is located at the specific location.

12. The method of claim 6, wherein the combination is any one of a series combination and a parallel combination.

* * * * *